(12) United States Patent
Griffin et al.

(10) Patent No.: US 7,114,112 B2
(45) Date of Patent: Sep. 26, 2006

(54) METHOD, SYSTEM, AND PROGRAM FOR SIMULATING INPUT/OUTPUT (I/O) REQUESTS TO TEST A SYSTEM

(75) Inventors: Timothy Alan Griffin, Tuscon, AZ (US); Roger Gregory Hathorn, Tucson, AZ (US); Bret Wayne Holley, Tuscon, AZ (US); Lawrence Carter Blount, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 10/465,369

(22) Filed: Jun. 18, 2003

(65) Prior Publication Data

US 2004/0260993 A1 Dec. 23, 2004

(51) Int. Cl.
*G01R 31/28* (2006.01)

(52) U.S. Cl. ............................ 714/741; 714/743
(58) Field of Classification Search ............. 370/395.3; 455/67.11; 703/13; 714/43, 743, 741
See application file for complete search history.

(56) References Cited

U.S. PATENT DOCUMENTS

| | | | |
|---|---|---|---|
| 4,985,889 A * | 1/1991 | Frankish et al. ......... | 370/395.3 |
| 5,077,598 A | 12/1991 | Bartelink | |
| 5,537,663 A | 7/1996 | Belmont et al. | |
| 5,634,098 A | 5/1997 | Janniro et al. | |
| 5,717,903 A | 2/1998 | Bonola | |
| 5,737,578 A | 4/1998 | Hennenhoefer et al. | |
| 5,794,013 A | 8/1998 | McBrearty | |
| 5,913,218 A | 6/1999 | Carney et al. | |
| 5,953,516 A | 9/1999 | Bonola | |
| 6,148,424 A | 11/2000 | Tsutsui | |
| 6,169,883 B1 * | 1/2001 | Vimpari et al. .......... | 455/67.11 |
| 6,324,492 B1 * | 11/2001 | Rowe ......................... | 703/13 |
| 6,499,102 B1 | 12/2002 | Ewertz | |
| 6,904,544 B1 * | 6/2005 | DeRolf et al. ............... | 714/43 |
| 2002/0046016 A1 | 4/2002 | Debling | |

FOREIGN PATENT DOCUMENTS

| | | |
|---|---|---|
| EP | 0569128 A2 | 11/1993 |
| JP | 6208551 A | 7/1994 |

OTHER PUBLICATIONS

H. Hegener et al., "Test for Data Processing System", IBM Corp., Technical Disclosure Bulletin, vol. 18, No. 1 Jun. 1975, p. 78.

* cited by examiner

*Primary Examiner*—David Ton
(74) *Attorney, Agent, or Firm*—David W. Victor; Konrad Raynes & Victor LLP

(57) ABSTRACT

Provided are a method, system, and program for simulating I/O requests to test a system coupled to an adaptor having a port used for transmitting and receiving I/O requests to the system. A user test command is received indicating an I/O test object. The adaptor processes the I/O test object indicated in the user test command to generate a sequence of simulated I/O requests and transmits the generated simulated I/O requests to the system.

32 Claims, 4 Drawing Sheets

User Test Command

METHOD, SYSTEM, AND PROGRAM FOR SIMULATING INPUT/OUTPUT (I/O) REQUESTS TO TEST A SYSTEM

BACKGROUND OF THE INVENTION

1. Field of the Invention

The present invention relates to a system, method, and program for simulating Input/Output (I/O) requests to test a system.

2. Description of the Related Art

Computing systems often include one or more host computers ("hosts") for processing data and —running application programs, direct access storage devices (DASDs) for storing data, and a storage controller for controlling the transfer of data between the hosts and the DASD. Storage controllers, also referred to as control units or storage directors or servers, manage access to a storage space comprised of numerous hard disk drives connected in a loop architecture, otherwise referred to as a Direct Access Storage Device (DASD). Hosts may communicate Input/Output (I/O) requests to the storage space through the storage controller.

As part of the manufacturing process, the storage controller is stress and load tested before shipment to the customer. This test process requires that the storage controller be connected in an actual operating environment, which would include multiple host systems, switches, etc., and that the host systems would transmit I/O requests to the storage controller to stress and load test the storage controller's capability to handle the I/O load. This testing process is quite burdensome and expensive because the manufacturer must maintain and operate host systems capable of generating I/Os at a rate commensurate with the intended operating environment. Further, significant human labor is required to connect and disconnect host systems to the multiple I/O ports on each storage controller being tested for shipment. These labor costs are substantial when numerous storage controllers are being shipped. Further, a large warehouse floor space may be needed for the host systems and storage controllers being tested.

Moreover, as the number of I/O attachment ports in a storage controller increases, additional host systems, switches, and human labor are needed to connect to the increased number of I/O ports on the storage controller in order to stress and load test the additional ports.

For these reasons, there is a need in the art for improved and more cost effective techniques to stress and load test storage controllers and other I/O devices that are intended to interface with numerous connected devices that transmit I/O.

SUMMARY OF THE PREFERRED EMBODIMENTS

Provided are a method, system, and program for simulating I/O requests to test a system coupled to an adaptor having a port used for transmitting and receiving I/O requests to the system. A user test command is received indicating an I/O test object. The adaptor processes the I/O test object indicated in the user test command to generate a sequence of simulated I/O requests and transmits the generated simulated I/O requests to the system.

In further implementations, a determination is made as to whether indication is made in the system to generate simulated I/O requests in response to receiving the user test command, wherein the user test command is not processed by the adaptor if the indication is not made in the system to generate simulated I/O requests.

In yet further implementations, the adaptor includes a plurality of I/O test objects defining a sequence of I/O requests, wherein the user test command identifies one of the I/O test objects included in the adaptor, and wherein the identified I/O test object in the adaptor is processed to generate the sequence of simulated I/O requests.

Yet further, the system may be coupled to a storage system, and wherein the adaptor logic further performs determining a configuration of logical units in the storage system coupled to the system and directing the simulated I/O requests to at least one determined logical unit.

Described implementations provide techniques to use an adaptor to generate simulated I/O requests to test the operations of a system managing access to a storage device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
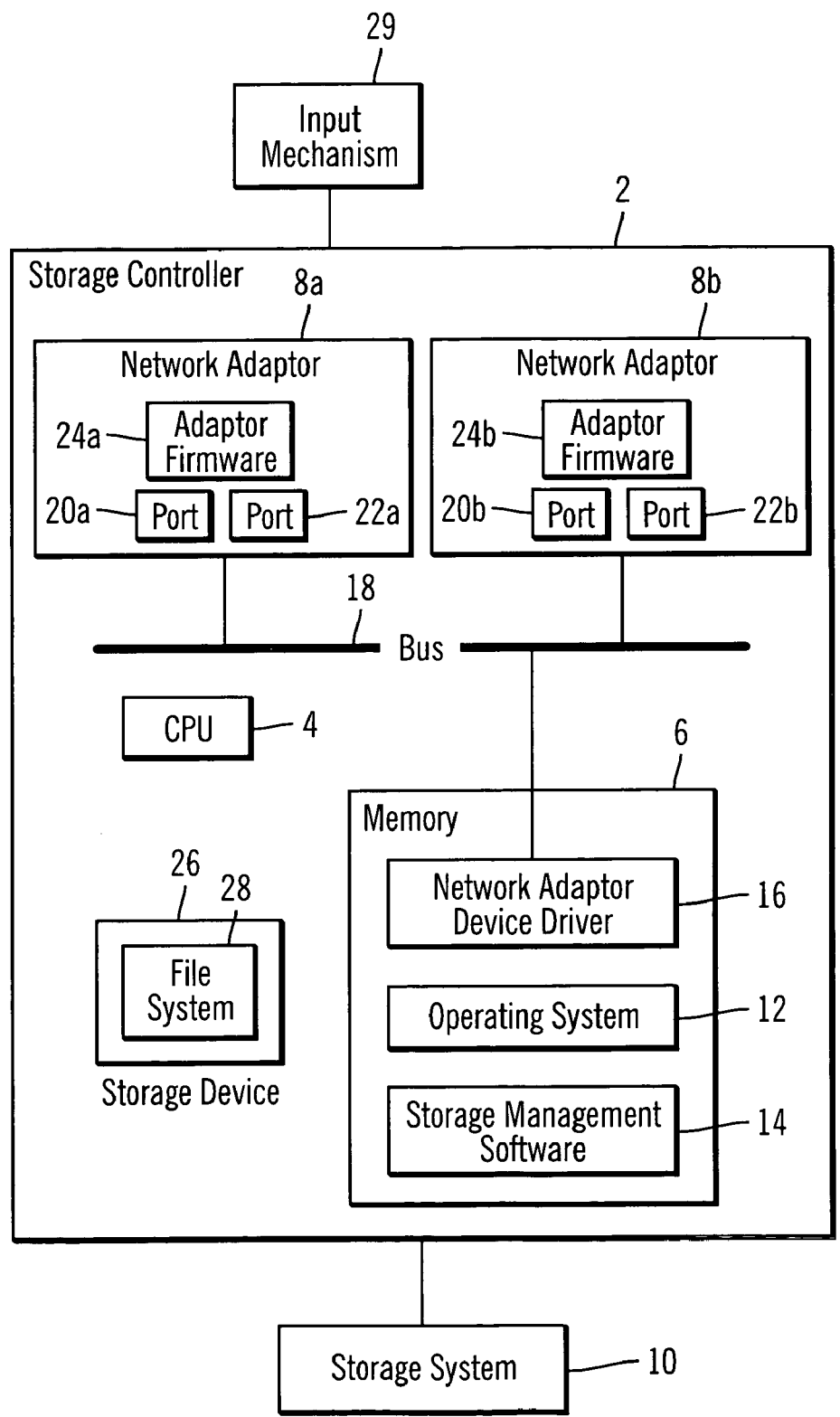
FIG. 1 is a block diagram illustrating a computing environment in which aspects of the invention are implemented.

FIG. 1 illustrates a storage controller 2 including a central processing unit (CPU) 4, memory 6, and two network adaptors 8*a*, 8*b* to communicate with network devices. The storage controller 2 may comprise any storage subsystem or server known in the art, such as the IBM Enterprise Storage Server (ESS)®, 3990® Storage Controller, etc. (Enterprise Storage Server is a registered trademark of IBM). The storage controller 2 is coupled to a storage system 10, which may comprise an array of storage devices, such as Just a Bunch of Disks (JBOD), Redundant Array of Independent Disks (RAID) array, virtualization device, etc.

The storage controller 2 includes programs such as an operating system 12, storage management software 14 to manage I/O requests directed to the storage controller 2, and a network adaptor device driver 16 to provide an interface between the operating system 12 and the network adaptors 8*a*, 8*b*. A device driver includes device specific commands to communicate with and control one or more attached devices, such as network adaptors. The network adaptor device driver 16 would communicate with the network adaptors 8*a*, 8*b* over a bus interface 18, such as a Peripheral Component Interconnect (PCI) bus or any other bus architecture known in the art. Each network adaptor 8*a*, 8*b* includes one or more ports 20*a*, 22*a* and 20*b*, 22*b* and adaptor firmware 24*a*, 24*b* to perform adaptor operations. The storage controller 2 may further execute additional device drivers to interface with different attached devices, such as device drivers to interface with storage adaptors that provide a connection to the storage system 10 (not shown). Although two network adaptors 8*a*, 8*b* are shown, the storage controller 2 may have just one or more than two network adaptors.

The storage controller 2 further includes an internal storage device 26, such as a hard disk drive, having a file system 28 used by the storage controller 2 to store programs and data processed by the storage controller 2. Programs executing in memory 4 may be swapped between memory 4 and the storage device 26. An input mechanism 29 is coupled to the storage controller 2 to enable a user to send commands to the storage controller 2 to initiate I/O simulation. The input mechanism 29 may comprise a separate computer system that is connected to the storage controller 2 via a direct line (parallel, serial, etc.) or through a network port. Alternatively, the input mechanism 29 may comprise an input device coupled to the storage controller 2, such as a keyboard, mouse, pen-stylus, microphone, touch sensitive display screen, or any other activation or input mechanism known in the art, etc.

Figure 2:
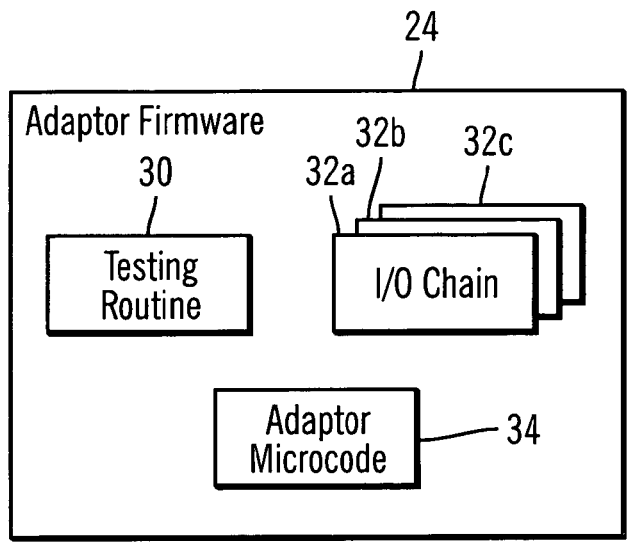
FIG. 2 illustrates logic implemented in adaptor firmware in accordance with implementations of the invention.

FIG. 2 illustrates components included within the adaptor firmware 24, including a testing routine 30 having logic to perform testing related operations, and one or more prepackaged I/O chains 32*a*, 32*b*, 32*c*. Each I/O chain 32*a*, 32*b*, 32*c* may include a type of sequence of simulated I/O requests that the testing routine 30 would generate and transmit to the device driver 16. Adaptor microcode 34 includes logic to perform standard adaptor 8*a*, 8*b* operations, such as transmitting and receiving I/O requests from and to the device driver 16 and ports 20*a*, 22*a* and 20*b*, 22*b*.

Described implementations provide a technique to cause the network adaptor 8*a*, 8*b* to simulate I/O requests to stress and load test the storage controller 2 by simulating a sequence of I/O requests that an attached host systems would transmit to the storage controller 2 in an operating network environment. For instance, one I/O chain 32*a*, 32*b*, 32*c* may cause the testing routine 30 to simulate write requests that could test the cache and destaging capabilities, another I/O chain may simulate read requests to further test the cache and staging capabilities, and other I/O chains may generate sequential and random I/O requests, or mixed sequences of different types of I/O requests to stress and load test different capabilities of the storage controller 2.

Figure 3:
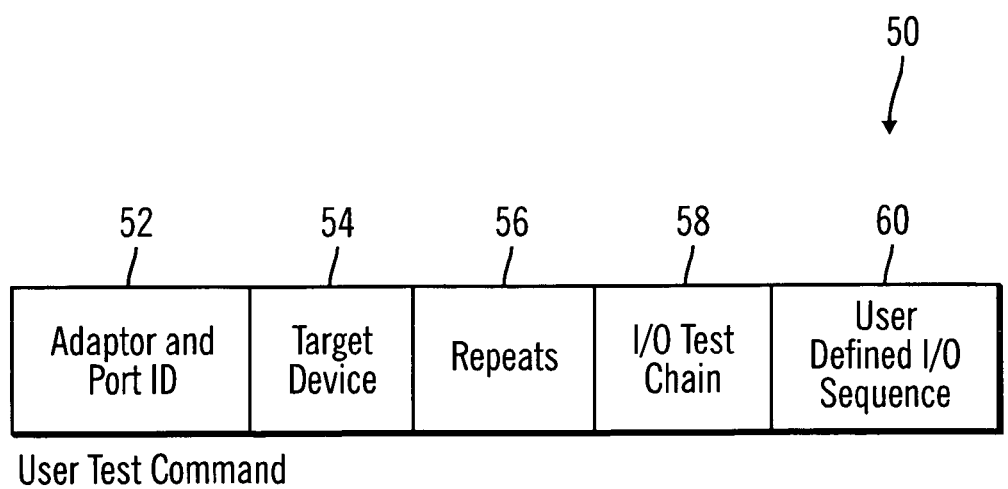
FIG. 3 illustrates information included with a user test command to initiate simulated I/O requests in accordance with implementations of the invention.

FIG. 3 illustrates parameters in a test command 50 that a user would transmit to the storage controller 2 from a system coupled to the storage controller 2 or through an input device, e.g., keyboard, connected to the storage controller 2. The user test command parameters 50 may include:

Adaptor and Port ID 52: identifies the adaptor 8*a*, 8*b* and port 20*a*, 22*a*, 20*b*, 22*b* which will appear to generate the simulated I/O requests. Alternatively, a logical port may be used to generate simulated I/O requests.

Target Device 54: Identifies an attached I/O device, volume, logical subsystem, etc., to which the simulated I/O requests are directed. The target device 54 may indicate multiple devices to which the simulated I/O requests are directed.

Repeats 56: Indicates a number of times to generate simulated I/O requests. A code may be used to designate continual generation of the I/O requests, which could be terminated by a subsequent user test command to terminate I/O simulation testing. In alternative implementations, the field 56 may indicate a time period during which the I/O sequence is executed, such that simulated I/O requests would be continually generated until the time period has expired.

I/O Chain 58: identifies one of the prepackaged I/O chains 32*a*, 32*b*, 32*c* to use to generate simulated I/O requests.

User Defined I/O Sequence 60: a set of I/O requests programmed by the user to use to generate the simulated I/O requests to test the storage controller 2. The user defined I/O sequence 60 may comprise a file or other object including a sequence of I/O requests to simulate. If the user identifies a prepackaged I/O chain 32*a*, 32*b*, 32*c* included in the adaptor firmware 24, then the user defined I/O sequence 60 may be empty, and if the user provides a user defined I/O sequence 60, then the I/O chain field 58 may be empty.

Figure 4:
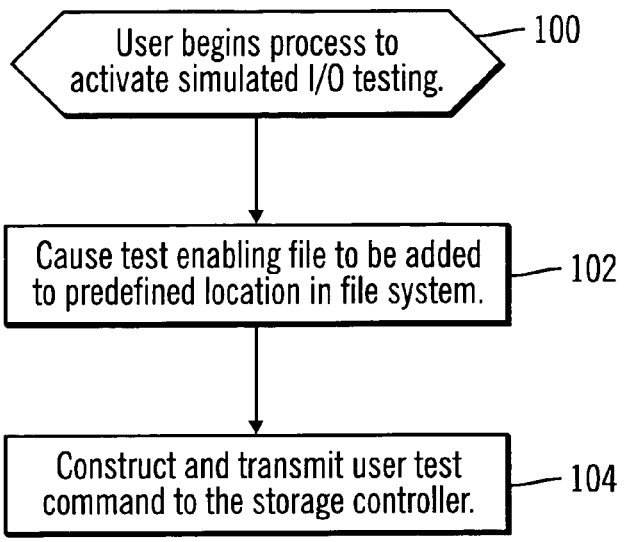
FIG. 4 illustrates user operations to initiate I/O simulation mode in accordance with implementations of the invention.

FIG. 4 illustrates operations a user would perform at the input mechanism 29 to cause the storage controller 2 to initiate I/O simulation mode to generate I/O requests to stress and load test the storage controller 2 I/O functionality and performance. Upon initiating operations to activate simulated I/O testing (at block 100), the user would send input commands (at block 102) to the storage controller 2 to cause a test enabling file to be added to a predetermined location in the file system 28. A test enabling file is a file having a name and predetermined content that the adaptor firmware 24 requires before proceeding with I/O simulation. This ensures that the I/O simulation mode is not inadvertently activated to generate I/Os during normal user I/O operations that could overwrite user data in the storage system 10. In additional implementations, the user may select a setting in the storage controller 2 to indicate I/O simulation mode. After activating the test enabling file or setting, the user may then construct and transmit (at block 102) the user test command 50 (FIG. 2) to the storage controller 2. The user can specify the tests to perform by identifying one of the prepackaged I/O chains 32*a*, 32*b*, 32*c* included in the adaptor firmware 24 or include with the user test command 50 a file or object having a user defined I/O sequence 60. The user can create the user defined I/O sequence capturing a sequence of I/O commands on an I/O trace of Input/Output operations at a storage controller. Alternatively, the user may execute I/O programs in a storage controller and intercept the I/O requests and IOCTL calls with a channel emulation program.

Figure 5:
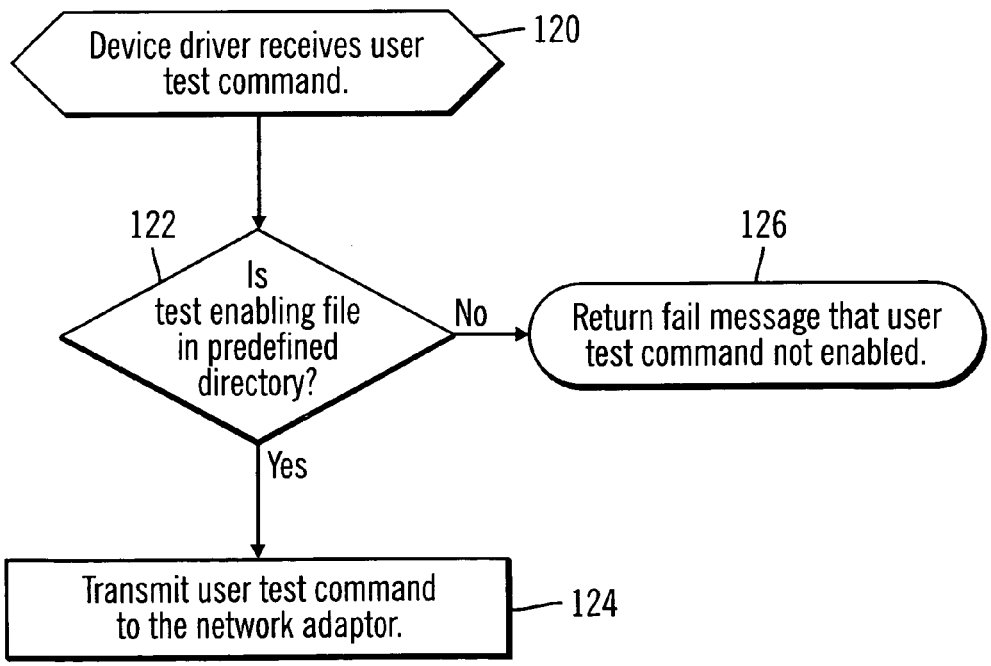
FIGS. 5 and 6 illustrates operations performed by a device driver and adaptor, respectively, to implement I/O simulation mode at a system in accordance with implementations of the invention.

FIG. 5 illustrates operations performed by the network adaptor device driver 16 to process the user test command 50 and initiate the I/O simulation mode. The operating system 12 would send the user input command 50 from the user input mechanism 29 to the device driver 16. Upon the device driver 16 receiving (at block 120) the user test command 50, if (at block 122) the test enabling file is in the file system 28 at the predefined location or the test enabling setting is made elsewhere in the storage controller 2, then the device driver 16 would transmit (at block 124) the received user test command 50 to the network adaptor 8*a*, 8*b* identified in the adaptor and port ID field 52 (FIG. 3) of the command 50. If no adaptor and port ID 52 is specified, then the device driver 16 may send the user input command 50 to a default network adaptor 8*a*, 8*b*. In further implementations, the device driver 16 may transform the received user input command 50 into a command used by the adaptor firmware 24. If (at block 122) the test enabling file is not at the predetermined file system 28 location or the test enabling setting was not made, then control ends (at block 126) with a return message of fail that may indicate the reason for the failure, i.e., no test enabling file or setting provided. In this way, the test enabling file or setting check requires that the user indicate in the storage controller 2 an intention to enter I/O simulation mode independent of the user test command 50 (by way of storing a predefined file at a predefined storage location, making a setting selection in a program, etc.). This avoids the situation where a user test command is inadvertently received when there was no intention to enter I/O simulation mode, and would generate I/Os that would unintentionally overwrite user data in the storage system 10.

Figure 6:
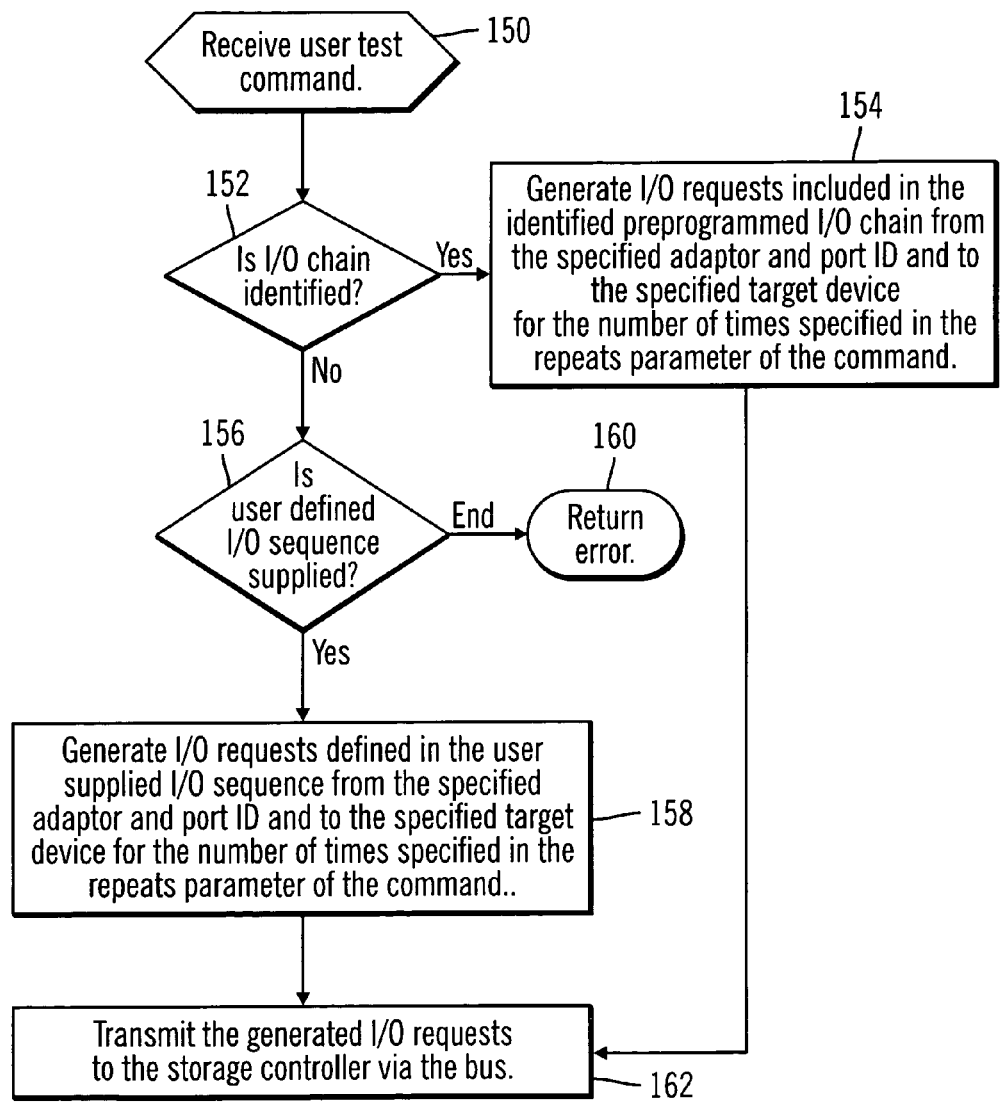

FIG. 6 illustrates operations performed by the testing routine 30 in the adaptor firmware 24 (FIG. 2) to generate I/O requests in I/O simulation mode to stress and load test the storage controller I/O components. Upon receiving (at block 150) the user test command 50 (or some modified form of that as generated by the device driver 16), if (at block 152) an I/O test chain 58 is identified, then the testing routine 30 generates (at block 154) I/O requests included in the identified preprogrammed I/O chain 32a, 32b, 32c to the specified target device for the number of times specified in the repeats parameter 56 of the user test command 50. The identified adaptor and port ID 52 would also be set in the I/O requests generated. If (at block 152) no I/O test chain 58 is identified and if (at block 156) a user defined I/O sequence 60 is provided, then the test routine 30 generates (at block 158) I/O requests defined in the user supplied I/O sequence 60 from the specified adaptor and port ID 52 to the specified target device 54 for the number of times specified in the repeats parameter 56 of the user test command 50. If no I/O test chain 58 is identified or if no user defined I/O sequence 60 is supplied, then an error is returned (at block 160) indicating an incomplete user test command 50. After generating the I/O requests at block 154 or 158, the adaptor firmware 24 transmits (at block 162) the generated simulated I/O requests to the storage controller 2 I/O components via the bus 18.

The simulated I/O requests the network adaptors 8a, 8b generates would then be handled by the storage controller 2 as I/O requests generated during normal I/O operations. In I/O simulation mode, the network adaptors 8a, 8b may discard any data the storage controller 2 returns in response to I/O requests. Further, the storage controller 2 may gather performance and operational statistics in a manner known in the art while processing the simulated I/O requests as normal host I/O requests. The user may then access gathered performance measurements to determine whether the storage controller 2 is operating as designed when processing the simulated I/O requests. Further, the test routine 30 may stop running I/O requests after the I/O test chain 32a, 32b, 32c or user defined I/O sequence is generated a number of times indicated in the repeats field 56, or after a user test command requesting to terminate I/O simulation mode is received by the device driver 16.

In certain implementations, the device driver 16 may delete the test enabling file or set the test enabling setting to indicate no I/O simulation mode after executing the user test command 50 or in response to a user command terminating I/O simulation mode. Alternatively, the test enabling file or setting may remain set indicating I/O simulation mode until the user specifically changes the test enabling file or setting to indicate no I/O simulation mode.

With the described implementations, in response to a user test command, the storage controller network adaptors would generate simulated I/O requests to stress and load test the storage controller 2 components that handle I/O operations. Different I/O chains and user defined I/O sequence may perform different types of load and stress tests to test different aspects of the storage controller operations. This avoids the need to use labor, floor space, and host systems to connect to the storage controller 2 to perform I/O stress and load tests. Instead, all the stress and load I/O tests are generated internally by the storage controller network adaptors. The described I/O simulation mode may be used to perform failure analysis of storage controller 2 components and subcomponents before the storage controller is shipped, to failure test parts or systems returned by the customer, or to run tests when providing customer support after the storage controller is shipped and setup at the customer site.

In further implementations, a customer support representative can instruct the user to send user test commands to the storage controller or remotely transmit user test commands to the storage controller over a network, such as the Internet, to perform diagnostic tests as part of providing customer support. This avoids the need to send a technician to test the storage controller on the customer site or have the customer return the storage controller to the manufacturer for testing.

In still further implementations, the testing routine 30 (FIG. 2) can query the storage controller 2 to determine the device configuration of the storage system 10, e.g., the device addresses, logical subsystems, etc. If the user does not specify a specific target device, then the testing routine 30 in the adaptor firmware 24 may utilize the knowledge of the device configuration to select a target device to which to direct the sequence of simulated I/O requests. Further, the testing routine 30 may configure a logical subsystem within the storage device to use for the simulated I/O requests. Thus, the user may specify a target device in the target device field 54 of the user test command 50 (FIG. 3) or, alternatively, the testing routine 30 may automatically select a target device based on the determined storage system 10 configuration or configure a volume or logical subsystem within the storage system 10 to use for simulated I/O requests. Still further, upon determining the storage system 10 configuration, the testing routine 30 can direct the simulated I/O requests to all devices and logical volumes determined to be part of the storage system 10 configuration.

In yet further implementations, while running simulated I/O requests, the network adaptors 8a, 8b could concurrently process user application I/O requests, such that the simulated I/O operations run simultaneously with normal I/O processing. The simulated I/O requests may be directed to a volume or logical subsystem that does not include user data to avoid overwriting user data. Also, while running the simulated I/O requests, performance statistics can be gathered for the simulated I/O requests as well as user generated I/O requests to allow a comparison of how the storage controller 2 handles the stress and load of user I/O requests and simulated I/O requests.

ADDITIONAL IMPLEMENTATION DETAILS

The described techniques for performing I/O simulation may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations were described with respect to generating simulated I/O requests at a storage controller or server. In alternative implementations, the network adaptor including the testing capabilities, e.g., testing routine 30, may be included within any computer device known in the art, such as a personal computer, laptop, hand held computer, telephony device, workstation, etc. Still further, the simulated I/O requests may be generated at other types of I/O devices having an adaptor to perform stress and load tests of such devices, such as a printer, disk drive controller, etc.

In described implementations, the simulated I/O requests were generated by the firmware of a network adaptor in conjunction with a network adaptor device driver. In alternative implementations, the code to generate simulated I/O requests may be included in other types of I/O device and device drivers that would normally transmit I/O requests to the system, such as a printer, input device, etc. Further, the code for generating the simulated I/O requests may be included with different types of hardware ports, other than network adaptors.

In described implementations, the preprogrammed I/O chains 32a, 32b, 32c in the adaptor firmware 24 and in a user defined I/O sequence 60 comprised a data structure including the sequence of I/O requests to generate. In alternative implementations, the I/O chain 32a, 32b, 32c and user defined I/O sequence 60 may comprise a script file including commands describing a sequence of I/O requests to generate that when processed by the testing routine 30 instruct the testing routine 30 to generate a specific sequence of I/O requests. In still further implementations, the I/O chains and user defined sequence may include a combination of I/O request sequences and instructions to generate I/O requests.

In described implementations, the adaptor firmware 24a was capable of generating a sequence of I/O requests from preprogrammed I/O chains 32a, 32b, 32c or a user defined I/O sequence transmitted with the user test command. In alternative implementations, the adaptor firmware 24 may be designed to generate I/O requests from only one of these sources, e.g., a preprogrammed I/O chain or user defined I/O sequences.

The network adaptors may comprise any type of network adaptor known in the art, such as a Ethernet network adaptor, Fibre Channel network adaptor, wireless fidelity (Wi-Fi) adaptor, etc.

The illustrated logic of FIGS. 3–5 show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for simulating I/O requests to test a system coupled to an adaptor having a port used for transmitting and receiving I/O requests to the system, comprising:
   receiving a user test command indicating an I/O test object;
   processing, with the adaptor, the I/O test object indicated in the user test command to generate a sequence of simulated I/O requests;
   transmitting, with the adaptor, the generated simulated I/O requests to the system.

2. The method of claim 1, further comprising:
   determining whether indication is made in the system to generate simulated I/O requests in response to receiving the user test command, wherein the user test command is not processed by the adaptor if the indication is not made in the system to generate simulated I/O requests.

3. The method of claim 2, wherein determining whether the indication is made comprises:
   determining whether a test enabling file is stored in a file system of the system, wherein the indication is made to generate simulated I/O requests if the test enabling file is stored in the file system.

4. The method of claim 1, wherein the user test command indicates at least one target I/O device, wherein the simulated I/O requests are directed to the at least one indicated target I/O device.

5. The method of claim 1, wherein the adaptor includes a plurality of I/O test objects defining a sequence of I/O requests, wherein the user test command identifies one of the I/O test objects included in the adaptor, and wherein the identified I/O test object in the adaptor is processed to generate the sequence of simulated I/O requests.

6. The method of claim 1, wherein the I/O test object comprises a defined sequence of I/O requests transmitted with the user test command.

7. The method of claim 1, wherein the I/O test object includes at least one of (i) a sequence of I/O requests and (ii) code to cause the adaptor to generate the sequence of I/O requests.

8. The method of claim 1, wherein the user test command is received at a device driver, further comprising:
   transmitting, with the device driver, the user test command to the adaptor.

9. The method of claim 1, wherein the adaptor comprises a network adaptor and the system comprises a storage controller.

10. The method of claim 9, wherein the user test command is received in order to perform stress and load testing of the storage controller.

11. The method of claim 1, further comprising:
determining, with the adaptor, a configuration of logical units in a storage system coupled to the system; and
directing the simulated I/O requests to at least one determined logical unit.

12. The method of claim 11, further comprising:
determining, with the adaptor, devices in a storage system coupled to the system;
configuring, with the adaptor, a logical unit within one determined device; and
directing the simulated I/O requests to the at least one configured logical unit.

13. The method of claim 1, further comprising:
transmitting, with the adaptor, user I/O requests concurrently with the simulated I/O requests, wherein the system concurrently processes application I/O requests and the simulated I/O requests.

14. The method of claim 13, further comprising:
gathering, with the adaptor, performance statistics on the system processing of both the simulated I/O requests and application I/O requests.

15. A system, comprising:
a device driver including code to process a user test command indicating an I/O test object;
an adaptor including logic to perform the operations of:
(i) processing the I/O test object indicated in the user test command to generate a sequence of simulated I/O requests; and
(ii) transmitting the generated simulated I/O requests to the system.

16. The system of claim 15, wherein the device driver code further performs:
determining whether indication is made in the system to generate simulated I/O requests in response to receiving the user test command, wherein the user test command is not processed by the adaptor if the indication is not made in the system to generate simulated I/O requests.

17. The system of claim 15, wherein the adaptor includes a plurality of I/O test objects defining a sequence of I/O requests, wherein the user test command identifies one of the I/O test objects included in the adaptor, and wherein the identified I/O test object in the adaptor is processed to generate the sequence of simulated I/O requests.

18. The system of claim 15, wherein the system is coupled to a storage system, and wherein the adaptor logic further performs:
determining a configuration of logical units in the storage system coupled to the system; and
directing the simulated I/O requests to at least one determined logical unit.

19. An article of manufacture for simulating I/O requests to test a system coupled to an adaptor having a port used for transmitting and receiving I/O requests to the system, wherein the article of manufacture causes operations to be performed, the operations comprising:
receiving a user test command indicating an I/O test object;
processing, with the adaptor, the I/O test object indicated in the user test command to generate a sequence of simulated I/O requests;
transmitting, with the adaptor, the generated simulated I/O requests to the system.

20. The article of manufacture of claim 19, wherein the operations further comprise:
determining whether indication is made in the system to generate simulated I/O requests in response to receiving the user test command, wherein the user test command is not processed by the adaptor if the indication is not made in the system to generate simulated I/O requests.

21. The article of manufacture of claim 20, wherein determining whether the indication is made comprises:
determining whether a test enabling file is stored in a file system of the system, wherein the indication is made to generate simulated I/O requests if the test enabling file is stored in the file system.

22. The article of manufacture of claim 19, wherein the user test command indicates at least one target I/O device, wherein the simulated I/O requests are directed to the at least one indicated target I/O device.

23. The article of manufacture of claim 19, wherein the adaptor includes a plurality of I/O test objects defining a sequence of I/O requests, wherein the user test command identifies one of the I/O test objects included in the adaptor, and wherein the identified I/O test object in the adaptor is processed to generate the sequence of simulated I/O requests.

24. The article of manufacture of claim 19, wherein the I/O test object comprises a defined sequence of I/O requests transmitted with the user test command.

25. The article of manufacture of claim 19, wherein the I/O test object includes at least one of (i) a sequence of I/O requests and (ii) code to cause the adaptor to generate the sequence of I/O requests.

26. The article of manufacture of claim 19, wherein the article of manufacture includes a device driver, wherein the device driver performs:
transmitting the user test command to the adaptor.

27. The article of manufacture of claim 19, wherein the adaptor comprises a network adaptor and the system comprises a storage controller.

28. The article of manufacture of claim 27, wherein the user test command is received in order to perform stress and load testing of the storage controller.

29. The article of manufacture of claim 19, further comprising:
determining, with the adaptor, a configuration of logical units in a storage system coupled to the system; and
directing the simulated I/O requests to at least one determined logical unit.

30. The article of manufacture of claim 29, further comprising:
determining, with the adaptor, devices in a storage system coupled to the system;
configuring, with the adaptor, a logical unit within one determined device; and
directing the simulated I/O requests to the at least one configured logical unit.

31. The article of manufacture of claim 19, wherein the operations further comprise:
transmitting, with the adaptor, user I/O requests concurrently with the simulated I/O requests, wherein the system concurrently processes application I/O requests and the simulated I/O requests.

32. The article of manufacture of claim 31, wherein the operations further comprise:
gathering, with the adaptor, performance statistics on the system processing of both the simulated I/O requests and application I/O requests.

* * * * *